Nov. 14, 1950         A. V. MERSHON         2,530,022
INTEGRATING LOAD METER FOR ROTATING SHAFTS
Filed Aug. 26, 1948         2 Sheets—Sheet 1
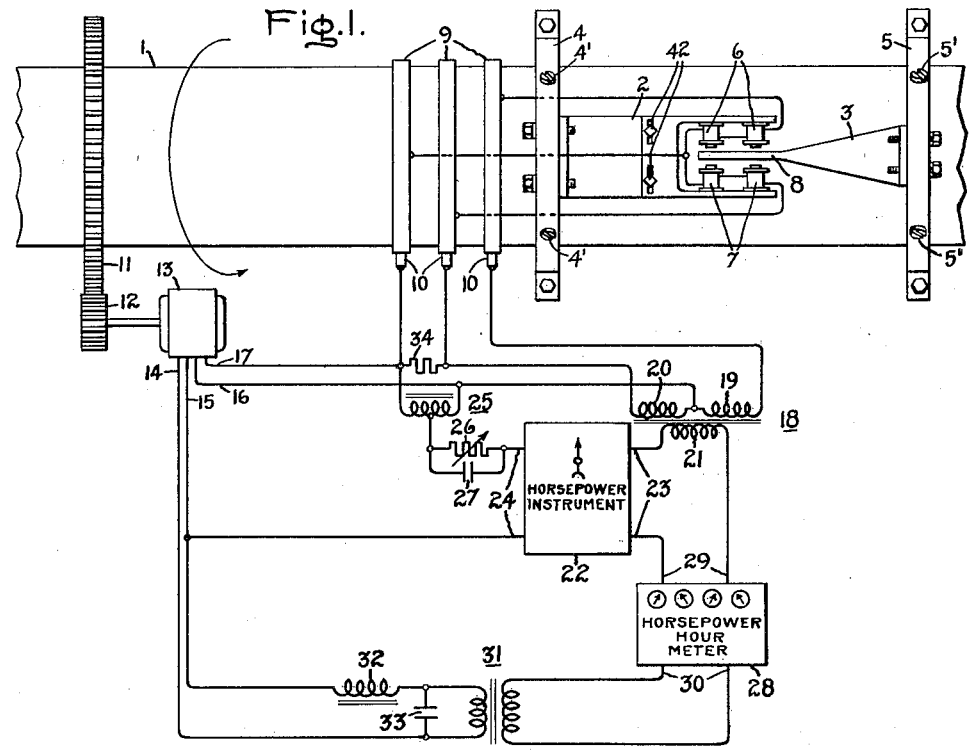
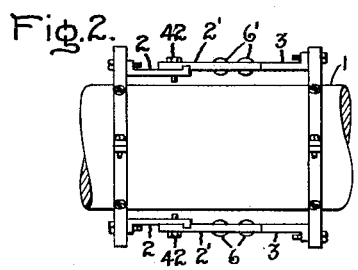
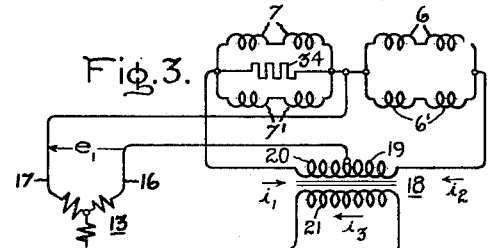
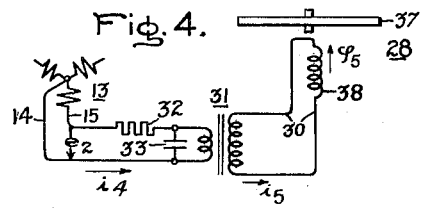
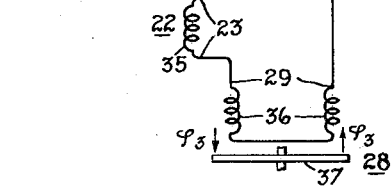
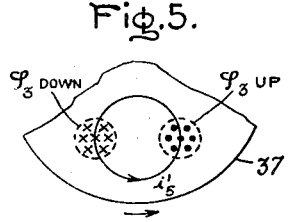
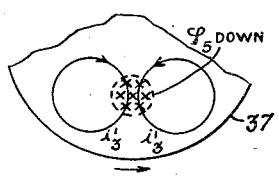
Inventor:
Alfred V. Mershon,
by Richard E. Hosley
His Attorney.

Nov. 14, 1950 A. V. MERSHON 2,530,022
INTEGRATING LOAD METER FOR ROTATING SHAFTS
Filed Aug. 26, 1948 2 Sheets-Sheet 2
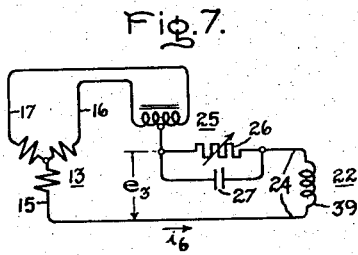
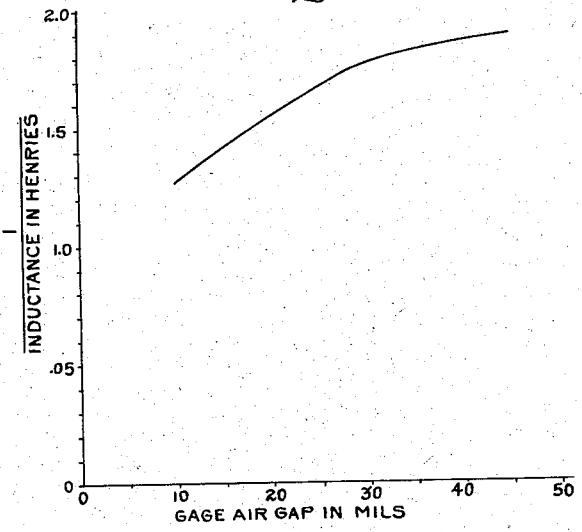
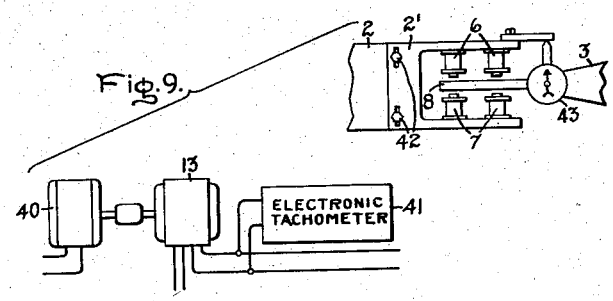
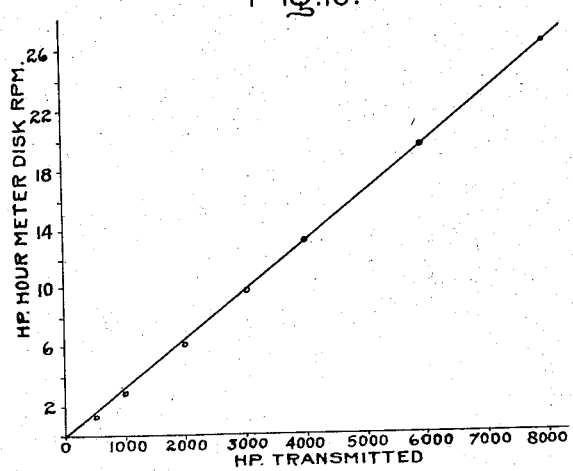
Inventor:
Alfred V. Mershon,
by Richard E. Hosley
His Attorney.

Patented Nov. 14, 1950

2,530,022

UNITED STATES PATENT OFFICE 2,530,022

INTEGRATING LOAD METER FOR ROTATING SHAFTS

Alfred V. Mershon, Schenectady, N. Y., assignor to General Electric Company, a corporation of New York Application August 26, 1948, Serial No. 46,195

2 Claims. (Cl. 73—136)

This invention relates to improved apparatus for measuring the load transmitted by a rotating shaft, and also for integrating such load measurement.

An object of the invention is to provide an improved integrating load meter for rotating shafts which is especially adapted for application to the propeller shafts of large ships, but may also be used in other applications.

Another object is to provide an improved integrating load meter combining good accuracy, reliability, and simplicity of construction and installation.

Other objects and advantages of the invention will become apparent as the description proceeds.

The features of the invention which are believed to be novel and patentable are pointed out in the claims forming a part of this specification. For a better understanding of the invention, reference is made in the description which follows to the accompanying drawing in which Fig. 1 is a schematic plan diagram of a preferred embodiment of the invention; Fig. 2 is an elevation showing the strange gage elements and their supports; Figs. 3, 4 and 7 are circuit diagrams showing respective parts of the electrical circuit; Figs. 5 and 6 are schematic diagrams showing eddy currents in a watthour meter disk; Fig. 8 is a chart showing the inductance characteristics of the magnetic strain gages; Fig. 9 shows the arrangement of elements for calibration; and Fig. 10 is a graphical representation of calibration data. Where the same part appears in more than one figure of the drawing it is always represented by the same reference number.

Referring now to Figs. 1 and 2, shaft 1 may be, for example, the propeller shaft of a ship, which rotates in the direction indicated by an arrow on the drawing and transmits torque from a motor or engine at its left-hand end to a propeller or other load at its right-hand end. Brackets 2 and 3 are respectively secured to the shaft at different points along its length by clamping rings 4 and 5. When shaft 1 transmits torque there is a torsional strain or twisting of the shaft which is proportional to the torque transmitted. This twisting produces a small relative movement of brackets 2 and 3. Preferably, clamping rings 4 and 5 are spaced apart a distance which will provide a relative movement of the two brackets of about 10 mils under full load torque. For example, with a 16⅞ inch diameter steel shaft which transmits 6000 horsepower at 90 R. P. M., the clamping rings are preferably spaced about 23 inches apart. Set screws 4' and 5' hold the clamping rings securely in place on the shaft.

Brackets 2 and 3 support magnetic strain gage units comprising coils 6 and 7 and armature 8. When the shaft is twisted, armature 8 moves toward coils 6 and away from coils 7. This increases the inductance of strain gages 6 and decreases the inductance of strain gages 7. Preferably, similar sets of strain gages 6' and 7', not shown in Fig. 1, are supported by brackets attached to the same clamping rings on the opposite side of shaft 1. This reduces errors caused by small bending movements of the shaft. The increasing-inductance gages 6 and 6' are electrically connected in parallel, and the decreasing-inductance gages 7 and 7' are likewise connected in parallel. Electrical connections to the gages are made through slip rings 9 and brushes 10, or other suitable means.

Gears 11 and 12 drive the rotor of an alternator 13 at a speed proportional to the rotational speed of shaft 1. Alternator 13 can be geared directly to the shaft as shown, or can be driven from the motor gear box or any other part having a rotational speed proportional to the speed of the shaft. Preferably, alternator 13 has a permanent-magnet rotor and a three-phase Y-connected stator with the neutral brought out. Output connection 14 is neutral, 15 is phase 1, 16 is phase 2, and 17 is phase 3. The alternator is designed so that the amplitude and the frequency of its output voltages are both proportional to the speed at which its rotor is driven, and hence to the rotational speed of shaft 1.

Transformer 18 has two primaries 19 and 20 wound in bucking relation to each other, and a secondary 21. Primary 19 is connected in series with strain gages 6, and primary 20 is connected in series with strain gages 7, as shown.

Horsepower instrument 22 is an electrodynamic wattmeter which has been recalibrated in terms of horsepower, as hereinafter explained. Connections 23 are connected to the wattmeter current or moving coil, and connections 24 are connected to the wattmeter potential or field coil. Center tapped inductor 25 is connected between phase 2 and phase 3 of the alternator, as shown. Resistor 26 and capacitor 27 are provided for reasons hereinafter explained.

Horsepower hour meter 28 is a modified induction type watthour meter. Connections 29 are connected to the current coils of the watthour meter, and connections 30 are connected to its potential coil. Transformer 31 may provide a voltage step-up of 2 to 1, for example, to provide a larger voltage for operating meter 28. Inductor 32 and capacitor 33 provide a small phase shift.

To balance the resistance characteristics of the strain gages, a resistor 34 may be connected in parallel with one set of strain gages as shown.

In the operation of the horsepower hour meter, a current which is proportional in amplitude to the torque transmitted by shaft 1 is applied to the current coils of horsepower hour meter 28 and horsepower instrument 22. Voltages which are proportional in amplitude to the rotational speed of the shaft are applied to the respective potential coils of the meter and the instrument. If the current and the voltage applied to instrument 22 are in phase or 180° out of phase, the indication of the instrument is proportional to their product. This in turn is proportional to the product of transmitted torque and the rotational speed of shaft 1, which is proportional to horsepower. It is thus possible to calibrate instrument 22 to indicate horsepower directly, or power in any other desired units. Meter 28 registers the product of current and voltage integrated or totalized over a period of time, and may be calibrated to register horsepower hours.

Refer now to Fig. 3, which is a circuit diagram of that part of the electrical circuit which supplies current to the respective current coils of the meter and the instrument. The stator of alternator 13 is represented schematically. The current or moving coil of instrument 22 is represented at 35, current coils of meter 28 are represented at 36 and the rotating disk of meter 28 is schematically represented by disk 37.

It is evident that strain gages 6, 6', 7, and 7' and transformer 18 constitute an essentially inductive bridge circuit. The position of armature 8 is adjusted as hereinafter explained so that when no torque is transmitted by the shaft, the inductance of the right-hand half of the bridge circuit equals the inductance of the left-hand half of the bridge circuit. Resistor 34 is added to equalize any differences in the resistances of the two halves. Current $i_1$ represents the current flowing in the left-hand side of the bridge, current $i_2$ represents the current flowing in the right-hand side of the bridge, and current $i_3$ represents current induced in secondary 21 of transformer 18 by any differences in amplitude of $i_1$ and $i_2$ caused by unbalance of the bridge. $\varphi_3$ represents magnetic flux through disk 37 as a result of current $i_3$ in current coils 36, and $e_1$ represents the instantaneous voltage from phase 2 to phase 3 of alternator 13.

As has been specified, the voltages generated by alternator 13 are proportional in both amplitude and frequency to the alternator rotor speed. This is easily arranged if an alternator having a permanent-magnet rotor is used, since this is the normal operating characteristic of such an alternator provided the alternator is operated well below its maximum rated output. This may be expressed mathematically by $E_1 = \omega K_1$, where $E_1$ is the peak value of the output voltage, $\omega$ equals $2\pi$ times frequency, and hence is proportional to the rotational speed of shaft 1, and $K_1$ is a constant of the alternator. Since the output of a well designed alternator is substantially sinusoidal, the instantaneous voltage is $$e_1 = \omega K_1 \sin \omega t$$

Let $Z_1$ be the impedance of the left-hand side of the bridge circuit. Neglecting resistances, which are kept as small as possible, $Z_1 = j\omega L_1$ where $L_1$ is the inductance of the left-hand side of the bridge circuit and $j$ is the operator $\sqrt{-1}$. It follows that:

$$i_1 = \frac{e_1}{Z_1} = \frac{\omega K_1}{j\omega L_1} \sin \omega t = -\frac{K_1}{L_1} \cos \omega t$$

Similarly, $$i_2 = -\frac{K_1}{L_2} \cos \omega t$$

where $L_2$ is the inductance of the right-hand side of the bridge circuit. Then $$i_3 = i_1 - i_2 = K_1 \left( \frac{1}{L_2} - \frac{1}{L_1} \right) \cos \omega t$$

If $$\left( \frac{1}{L_2} - \frac{1}{L_1} \right)$$

is made proportional to the torque transmitted by the shaft, as hereinafter explained, $$i_3 = K_2 T \cos \omega t$$

where $T$ is the transmitted torque and $K_2$ is a constant. Thus, the average value of $i_3$ is proportional to the transmitted torque.

Refer now to Fig. 4, which is a circuit diagram of that part of the electrical circuit which supplies voltage to the potential coil of meter 28. Let $e_2$ represent the instantaneous voltage from phase 1 of the alternator to neutral, $i_4$ represent current in the circuit including the primary of transformer 31, $i_5$ represent current in the circuit including the secondary of transformer 31, coil 38 represent the potential coil of meter 28, and $\varphi_5$ represent magnetic flux through disk 37 as a result of current $i_5$ in coil 38.

It is evident by analogy from the preceding analysis that $$e_2 = \omega K_3 \cos \omega t$$

where $K_3$ is a constant of the alternator. Again neglecting resistances, which are very small compared to the inductance of the circuit, $$i_4 = \frac{K_3}{L_4} \sin \omega t$$

where $L_4$ is the inductance of the circuit through which $i_4$ flows. If transformer 31 provides a 2 to 1 step-up ratio, $$i_5 = \frac{2K_3}{L_4} \sin \omega t$$

Since $L_4$ is a constant of the circuit, this can be written $i_5 = K_4 \sin \omega t$.

The fluxes $\varphi_3$ and $\varphi_5$ are respectively proportional to currents $i_3$ and $i_5$. Hence, $$\varphi_3 = K_5 T \cos \omega t$$

and $$\varphi_5 = K_6 \sin \omega t$$

It should be noted that $\varphi_3$ lags $\varphi_5$ by 90 degrees.

Flux $\varphi_3$ in passing through disk 37 induces therein a pattern of eddy currents, $$i'_3 = Y \frac{d\varphi_3}{dt} = -\omega Y K_5 T \sin \omega t$$

where $Y$ is the admittance of the path in the disk followed by eddy currents. These eddy currents lag $\varphi_3$ by 90 degrees and hence are in phase opposition with $\varphi_5$. Similarly, $\varphi_5$ induces an eddy current $$i'_5 = Y \frac{d\varphi_5}{dt} = \omega Y K_6 \cos \omega t$$

This eddy current is in phase with $\varphi_3$.

Refer now to Fig. 5, which schematically illustrates the magnetic flux and eddy current in disk 37 one-quarter cycle after $\varphi_5$ has passed through its maximum upward value. At this time $\varphi_5$ is substantially zero, but $i'_5$, which lags $\varphi_5$ by 90 degrees, is at its maximum. $\varphi_3$ is also maximum. The interaction of $\varphi_3$ and $i'_5$ produces a force to the right on disk 37 which is proportional to the product of the magnetic flux times the current, and tends to rotate disk 37 counterclockwise. Mathematically, the resulting turning moment on disk 37 may be expressed:

$$m_5 = K_7 i'_5 \varphi_3 = \omega Y K_5 K_6 K_7 \cos^2 \omega t$$

Refer now to Fig. 6, which shows the flux and eddy currents one-quarter cycle after those shown in Fig. 5. $\varphi_3$ is now substantially zero, and $i'_3$ is at its maximum value. $\varphi_5$ is now maximum in a downward direction. The interaction of $\varphi_5$ and $i'_3$ also produces a counterclockwise turning moment on the disk 37, which may be expressed $$m_3 = K_7 i'_3 \varphi_5 = -\omega Y K_5 K_6 K_7 T \sin^2 \omega t$$

The total turning moment on the disk is the sum of $m_3$ and $m_5$. Adding and substituting terms from the trigonometric relation $$\cos^2 \omega t - \sin^2 \omega t = \cos 2\omega t; \quad m_t = m_3 + m_5 = \omega K_8 T \cos 2\omega t.$$

Since $\omega$ is proportional to the rotational speed of the shaft and $T$ is the torque transmitted by the shaft, $\omega T$ is proportional to horsepower. Thus, the average turning moment on disk 37 is $M = K_9$ (H. P.), or, the turning moment on disk 37 is proportional to the horsepower transmitted by shaft 1. An opposing or braking moment is provided by a preferably adjustable permanent magnet braking element as is commonly employed in induction type watthour meters.

Meter 28 provides a registration which is proportional to the turning moment upon the disk integrated or totalized over a period of time, as in conventional induction watthour meters. It is evident that this registration is also proportional to horsepower hours, provided the specified relationships between voltage and current exist. These relationships depend upon the assumption that the circuit is wholly inductive—an assumption which is justified if the resistances in the circuits are kept very small compared to the inductances, and phase shifts are corrected as hereinafter explained.

It is the inductive nature of the circuit which permits the strain gage bridge circuit to be energized by voltage derived from an alternator driven by shaft 1. Although the voltage of the alternator varies with the speed of the shaft, its frequency varies in like manner; and, since the impedance of an inductive circuit varies with frequency, the current, which equals voltage divided by impedance, is a function of inductances only.

The difficulty now encountered is that even though the circuit is kept essentially inductive so that resistances contribute little to the total impedance of the circuit, resistance losses may still be large enough to produce substantial undesirable phase shifts. For example, losses produced by eddy currents flowing in disk 37 may slightly shift the phase of these eddy currents so that they are no longer exactly in quadrature with the flux which induced them. This phase shift is equivalent to a reduction in value of the components of such eddy current which interact with the magnetic fluxes to produce driving moments acting upon disk 37. This causes the indication of meter 28 to be lower than the true horsepower which should be indicated. Unfortunately, the error is not constant; but it is much greater at high speeds than at low speeds, because the phase shift varies with frequency of the voltage supplied to the meter, and hence with the speed of shaft 1. Other undesirable phase shifts result from iron losses in the meter winding cores, and from resistance losses in the meter coils and other parts of the circuit.

The error due to losses in the disk is considerably reduced by using a brass rotating disk in the horsepower hour meter rather than the aluminum disk which is more commonly used in watthour meters. The brass disk, because of its higher resistivity, provides smaller eddy current paths with reduced losses. Phase-shift errors are reduced about 60% by substituting a brass disk for the aluminum disk. The remaining errors can be substantially eliminated by providing a compensating phase shift through inductor 32 and capacitor 33 connected in the circuit as shown. The compensating phase shift varies with frequency in the same manner as the phase shifts causing errors, so that good compensation can be obtained throughout the range of the meter.

Refer now to Fig. 7, which is a circuit diagram showing that part of the electrical circuit which supplies voltage to the potential coil of instrument 22. Voltage $e_3$ from the center tap of inductor 25 to the first phase of alternator 13 is in phase with voltage $e_2$, and has an amplitude about ⅔ larger than that of $e_2$. This voltage is preferably obtained in the manner shown rather than directly from phase 1 of the alternator, to reduce the current flowing through the phase 1 alternator winding. Voltage $e_3$ is applied through connections 24 to the potential coil 39 of instrument 22. Since $e_3$ is in phase with $i_3$, the current supplied to the current coil of the instrument, the indication of instrument 22 is proportional to their product, and hence to horsepower transmitted by the shaft.

In electrodynamic wattmeters similar to instrument 22, currents through the two instrument coils must be in phase to give a correct indication. To accomplish this, the voltage circuit of instrument 22 must be substantially resistive. Therefore, a relatively large resistor 26 is connected in series with coil 39. Capacitor 27 is provided to compensate for phase shift caused by the inductance of the instrument potential coil.

For $i_3$ to be proportional to the transmitted torque as required, it is necessary that $$\left( \frac{1}{L_2} - \frac{1}{L_1} \right)$$

be linearly proportional to the amount of twist of shaft 1.

Refer now to Fig. 8, which shows the inductance characteristic of one of the strain gages used as a function of the air gap between the gage coil and armature 8. This shows that their is a decided knee in the inductance characteristic curve at an air gap of about 25 mils. For larger air gaps, the curve is reasonably linear. This indicates that the initial air gap chosen should be larger than 25 mils. Too large an air gap is not desirable, however, as the gage then loses sensitivity, as is shown by the increasing flatness of the curve corresponding to the larger air gaps.

Another point to be noted is that if all gages are initially set with equal air gaps, say 29 mils for example, when no torque is transmitted; then as load is applied to shaft 1, the air gap of one set of gages will increase to 34 mils, for example, while the air gap of the gages positioned on the opposite side of armature 8 will decrease to 24 mils. Due to the curvature of the inductance characteristic of the gages, those gages having a decreasing air gap will have a larger inductance change than the gages having an increasing air gap. It is, therefore, desirable that the initial air gap be made larger on those gages in which the air gap will decrease when torque is transmitted than on those gages for which the air gap will increase. If this is done, it is necessary to place more turns on the coils of the decreasing air gap gages than on the coils of the increasing air gap gages to secure an initial inductance balance.

I have found a good solution to be as follows: decreasing air gap gages, 900 turns, air gap 33 mils; increasing air gap gages, 850 turns, air gap 29 mils. When the gages are proportioned in this manner, current $i_3$ is substantially linearly proportional to transmitted torque throughout the range of the meter.

If shaft 1 is a low speed shaft, such as the propeller shaft of a ship which may have a maximum speed of rotation less than 100 R. P. M., it is preferable that gears 11 and 12 have a substantial step-up ratio so that the voltage generated by alternator 13 has a corresponding maximum frequency in the order of 280 cycles per second or more. This permits the use of a smaller alternator to provide a given voltage and smaller coils for given values of inductive reactance, and in particular permits the use of smaller strain gage coils on the rotating shaft. The smaller strain gages experience less stress from centrifugal force as the shaft rotates, and hence are less subject to errors caused by displacement due to such forces. Reduction in size of the meter and instrument coils permits the construction of smaller meters which occupy less space; and in addition, the higher frequency generally increases the inductive reactance of the coils relative to their resistance, and so reduces the phase shift difficulties hereinbefore explained.

Alternator 12 preferably has a permanent magnet field, as described, which requires no outside voltage for excitation. Therefore, the field magnetic flux is constant and independent of outside forces. If an alternator having a D.-C. excited field coil were used, the exciting current would have to be carefully regulated to prevent errors in value in the generated voltage due to variations in the field flux. Such current regulation would be especially difficult due to changes in resistance of the field coil with temperature variations, which may be severe in shipboard operation. Alternator 12 should provide output voltages having a maximum amplitude of about 100 volts rms from each phase to neutral. It is also possible to use a two phase alternator, or two single phase alternators mounted on the same shaft but displaced 90 degrees relative to each other, to obtain the two voltages in phase quadrature as required.

Freedom from the effects of temperature variation is realized throughout the circuit. Due to its highly inductive nature, impedances within the circuit are relatively unaffected by temperature changes as compared to resistive circuits since normally encountered temperature changes have much more effect upon the resistances of circuit elements than upon their inductance.

Values which have been found suitable for circuit elements are as follows: Instrument 22: voltage coil 39, 19 henry, D.-C. resistance 24 ohms; current coil 35, .0015 henry, D.-C. resistance 24 ohms. Meter 28: potential coil 38, .27 henry, D.-C. resistance 8 ohms; current coils 36, .32 henry, D.-C. resistance 61 ohms. Resistor 26, 1100 ohms; capacitor 27, .167 microfarad; inductor 32, .01 henry; capacitor 33, 2 microfarads; resistor 34, 125,000 ohms.

The integrating load meter can be installed on a ship and calibrated without running the ship's engine. This will now be described, referring to Fig. 9 for an illustration of the arrangement of elements for calibration. Elements not shown in Fig. 9 are arranged as in Fig. 1.

During calibration of the load meter, alternator 13 is not geared to shaft 1, but is driven at various predetermined speeds by an auxiliary D.-C. motor 40. The alternator speed is accurately measured with a tachometer 41, which may be of the electronic type.

When brackets 2 and 3 and clamping rings 4 and 5 are put on the ship's propeller shaft, jigs are used to obtain proper spacing so that the strain gage coils will assemble with air gaps of 33 mils between coil 6 and armature 8 and 29 mils between coils 7 and armature 8. The gage coils are set in approximate position with the aid of thickness gages to measure the air gaps. Bolts 42, which engage slots in section 2', are loosened slightly to permit movement of section 2' relative to the remainder of bracket 2, to permit adjustment of the air gaps. Mechanical gages 43, preferably the dial-indicator type adapted to measure relative displacements at least as small as 0.1 mil between section 2' and bracket 3, are installed on the brackets for calibrating purposes only, and are removed after calibration is completed and before the shaft is rotated.

Final adjustment of the air gaps is made with the alternator driven preferably at a speed to generate voltages having a frequency of about 280 cycles per second. The strain gage air gaps are then adjusted until the horsepower hour meter disk does not rotate or rotates very slightly in an "ahead" direction. At this point horsepower instrument 22 should also indicate "zero." The dial indicators of the mechanical gages are now set at their "zero" position.

Suppose that under full-load conditions shaft 1 will transmit 6000 horsepower at 90 revolutions per minute. If, for example, alternator 13 has 14 poles and the gear ratio to be used between shaft 1 and the alternator is 26.6 to 1, when the shaft rotates at 90 revolutions per minute alternator 13 will be driven at 2394 revolutions per minute, and will generate voltages having a frequency of 279.3 cycles per second. Assuming a propeller shaft having a solid, circular cross-section and made of steel having a shear modulus of elasticity of 12,000,000 pounds per square inch, the movement of armature 8 relative to coils 6 and 7 responsive to the torque transmitted by the shaft can be computed from the equation $$d = 3.344 \frac{l \, r_g (\text{H.P.})}{r_s^4 (\text{R.P.M.})}$$

where $d$=relative movement at the air gap in mils, $l$=length in inches between centers of clamping rings 4 and 5, $r_s$=radius of the shaft in inches, $r_g$=radius in inches from the center of the shaft to the center of the strain gage air gaps, (H. P.)=horsepower transmitted by the shaft, and (R. P. M.) = shaft speed in revolutions per minute. Assuming that $l=23$ inches, $r_s=8.4375$ inches, $r_g=10$ inches, (H. P.) = 6000, and (R. P. M.) = 90, then $d=10.12$ mils.

Brackets 2 and 3 are now relatively displaced 10.12 mils, as indicated by dial-indicator gages 43, alternator 13 is driven at 2394 revolutions per minute by the auxiliary D.-C. motor 40. This simulates conditions under which the propeller shaft transmits 6000 horsepower. Resistor 26 is adjusted until horsepower instrument 22 indicates 6000 horsepower.

If, for example, horsepower hour meter 28 has a register ratio of 20 to 1 and a multiplying factor of 1000, the proper disk speed is determined by the equation:

Meter disc R. P. M. =

$$\frac{6000 \text{ H. P.} \times 20 \text{ register ratio} \times 100 \text{ teeth}}{10 \times 1000 \text{ H. P. hours} \times 60 \text{ min./hour}} = 20 \text{ R. P. M.}$$

The permanent magnet braking element of the horsepower hour meter is then adjusted until the disk is observed to rotate at a speed of 20 revolutions per minute.

A similar procedure, except for adjustment of the instrument and the meter, may be followed to check the calibration at other assumed values of transmitted horsepower. Approximate ship propeller shaft speeds for such other horsepower values may be computed by assuming that speed varies as the cube root of horsepower. Fig. 10 is a curve graphically illustrating data relating to the horsepower hour meter obtained from such a series of calibration checks.

Brackets 2 and 3 are now returned to their "zero" relative position as indicated by the dial-indicator gages, and bolts 42 are tightened. The dial-indicator gages are removed; and alternator 13 is disconnected from the D.-C. motor and is connected to shaft 1 through gears 11 and 12.

Having described the principle of this invention and the best mode in which I have contemplated applying that principle, I wish it to be understood that the apparatus described is illustrative only, and that other means can be employed without departing from the true scope of the invention defined by the following claims.

What I claim as new and desire to secure by Letters Patent of the United States is:

1. A load meter for a rotating shaft comprising alternator means for generating first and second alternating voltages in phase quadrature and each proportional in amplitude and frequency to the rotational speed of such shaft, at least two magnetic strain gages mounted upon such shaft so that the inductance of at least one gage increases and the inductance of at least one other gage decreases responsive to twisting of the shaft, a transformer having two portions of its primary wound in bucking relation to each other, said two portions respectively being connected in series with said increasing inductance and decreasing inductance strain gages to form an essentially inductive bridge circuit, connections to energize said bridge circuit by said first voltage, said bridge circuit being balanced when no torque is transmitted by such shaft and unbalanced when the shaft is twisted by transmitted torque, so that current is induced in the secondary of said transformer which is proportional in amplitude to the torque transmitted by the shaft, and means responsive to the product of the amplitude of said second voltage and the amplitude of said current.

2. A load meter for a rotating shaft comprising an alternator adapted to generate first and second alternating voltages in phase quadrature and each proportional in amplitude and frequency to the driven speed of the alternator rotor, means for driving the rotor of said alternator at a speed proportional to the rotational speed of such shaft, two sets of magnetic strain gages mounted upon such shaft so that the inductance of one set increases while the inductance of the other set decreases responsive to twisting of the shaft, a transformer having two portions of its primary wound in bucking relationship to each other, said two portions respectively being connected in series with said two sets of strain gages to form an essentially inductive bridge circuit, connections to energize said bridge circuit by said first voltage, said bridge circuit being balanced when no torque is transmitted by such shaft and unbalanced when the shaft is twisted by transmitted torque, so that current is induced in the secondary of said transformer which is proportional in amplitude to the torque transmitted by the shaft, an instrument and an integrating meter each connected to respond to the product of the amplitude of said second voltage and the amplitude of said current.

ALFRED V. MERSHON.

REFERENCES CITED

The following references are of record in the file of this patent:

UNITED STATES PATENTS

| Number | Name | Date |
| --- | --- | --- |
| 2,240,184 | Hathaway | Apr. 29, 1941 |
| 2,287,794 | Gunn | June 30, 1942 |
| 2,402,719 | Allison | June 25, 1946 |
| 2,421,626 | Kuehni | June 3, 1947 |
| 2,461,685 | Godsey | Feb. 15, 1949 |

FOREIGN PATENTS

| Number | Country | Date |
| --- | --- | --- |
| 527,835 | France | Aug. 3, 1921 |